Nov. 17, 1931.  G. HEIM  1,832,207
ROLL INDENTING MACHINE
Filed July 8, 1929   3 Sheets-Sheet 1

Patented Nov. 17, 1931

1,832,207

UNITED STATES PATENT OFFICE

GOTTHILF HEIM, OF OBERESSLINGERN, GERMANY

ROLL INDENTING MACHINE

Application filed July 8, 1929, Serial No. 376,722, and in Germany March 18, 1929.

As is known rolls are provided by the bakers with an annular indentation where they may later be broken apart. Hitherto this indentation was made by hand which was inconvenient and wasted time besides being unhygienic.

Machines are also made for this purpose, but they all possess the disadvantage that the dough of the roll sticks to the pressing device thereby spoiling the shape of the roll.

This invention relates to a machine by means of which the indentation can be made without in any way spoiling the dough. The novelty consists chiefly in that above a feeding bed advanced periodically a vertically actuated bar is arranged which under the action of levers or the like is lowered onto the rolls and after pressing in the dough, is again raised, whereby resilient scrapers arranged on both sides of the bar hold back the dough of the roll onto the feeding bed when the indenting bar is being raised and only return to their initial position after the bar has parted from the roll.

An embodiment of the invention is illustrated by way of example in the accompanying drawings in which:—

Figure 1:
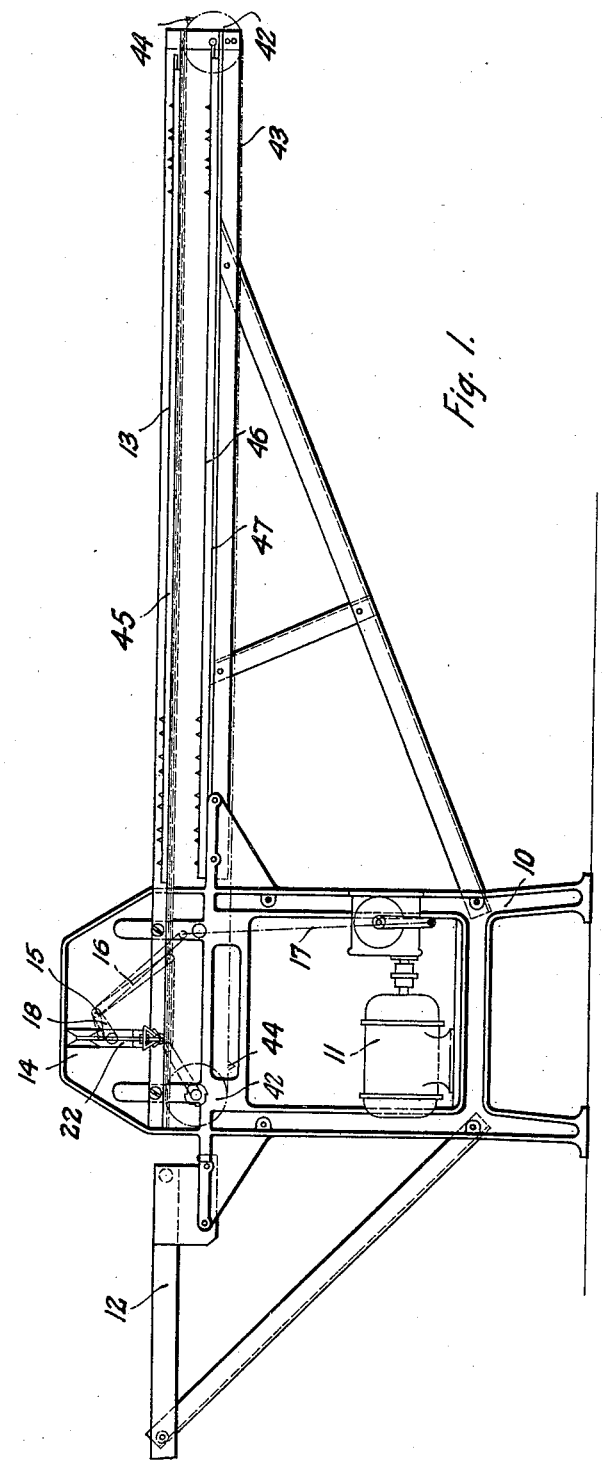
Fig. 1 shows the whole machine in side elevation.
Figure 2:
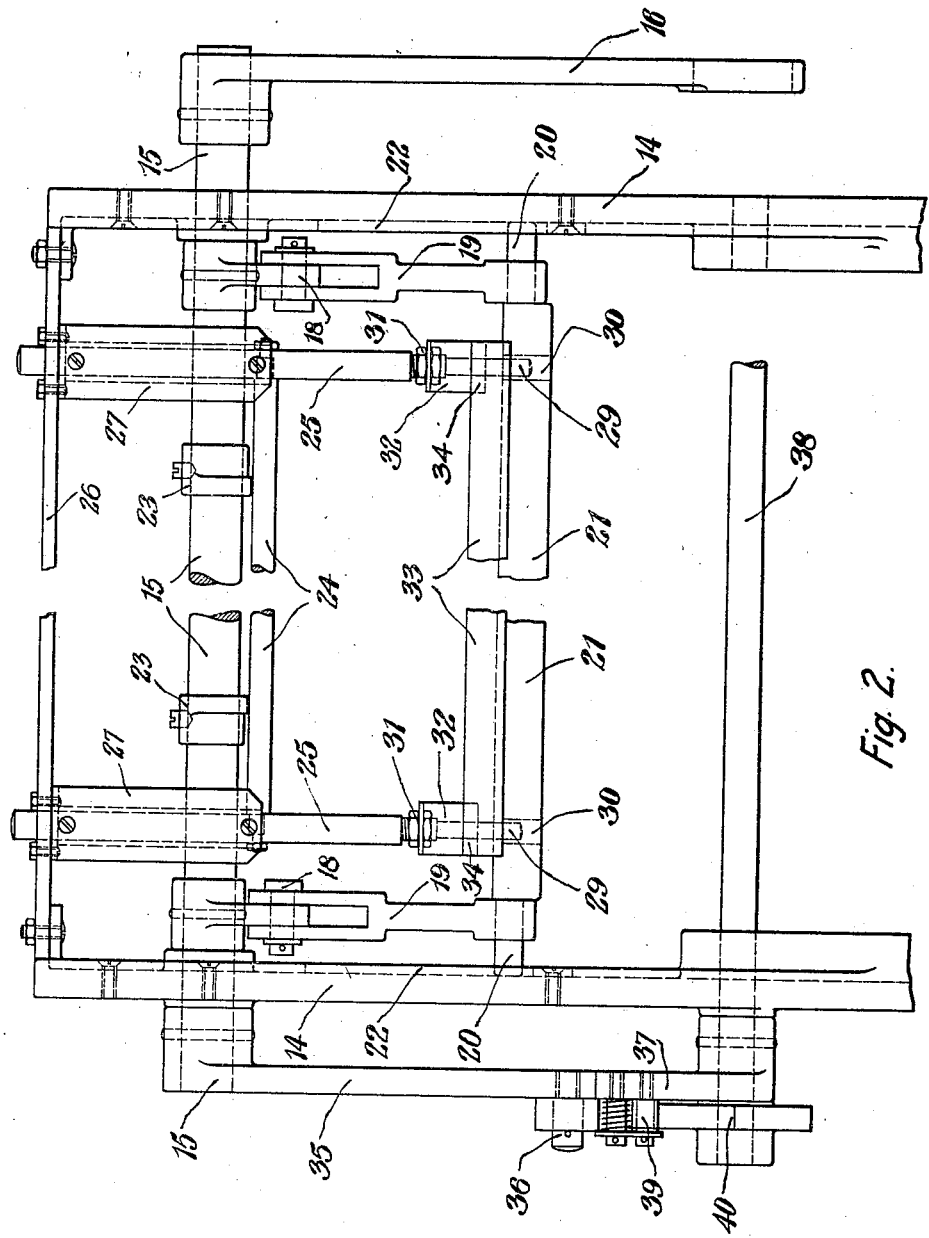
Fig. 2 is a partial front elevation of the machine.
Figure 3:
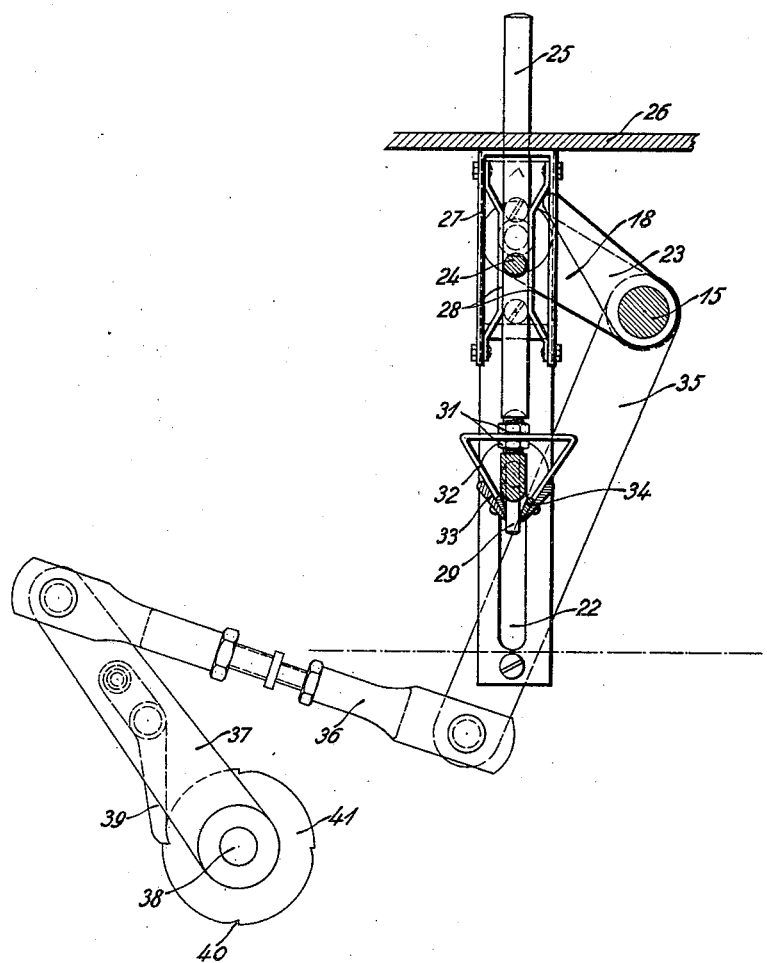
Fig. 3 shows in vertical section the indenting mechanism on a larger scale.

The machine consists of a frame 10, in which a driving motor 11 is mounted. On one side of this frame the delivery table 12 and on the other side the feeding arrangement 13 extend. A shaft 15 is journaled in the bearing plates 14. A lever 16 is mounted on this shaft and is driven from the motor 11 by a thrust rod 17 or the like. On the shaft 15 two levers 18 are also mounted which are hingedly connected with the end pins 20 of the slightly prismatic-shaped indenting bar 21 by means of links 19. The pins 20 are vertically guided in slots 22 in the bearing plates 14. The shaft 15 also carries nearer the middle two further levers 23 which act from above upon a rod 24 connecting two vertical rods 25 which are guided between clamping springs 28 in holders 27 secured to a yoke 26 and held by friction. The lower ends 29 of the rods 25 are guided straight in the bores 30 of the indenting bar 21 and the upper ends in the yoke 26.

Two inwardly bent resilient U-shaped holders 32 are displaceably fastened on the rods 25 by means of two nuts 31. Between two holders 32 bars 33 with a layer of felt 34 or the like are arranged and resiliently pressed against the indenting bar 21. On the end of the shaft 15 opposite to the driving lever 16 a second lever 35 is mounted which is hingedly connected with a lever 37 by means of an adjustable rod 36. The lever 37 is oscillatably mounted loosely on the driving shaft 38 of the automatic feed and carries a pawl 39. This pawl 39 actuates a ratchet wheel 41 provided with teeth 40, so that the shaft 38 is periodically rotated and the endless chain 43, guided over the sprocket wheels 42, is advanced in steps. Catches 44 arranged on the chain effect the feed of the collapsible bed 45 on which the rolls rest. The finished rolls provided with indentation can be tipped from the collapsible bed 45 onto a second collapsible bed 46 arranged under the bed 45, rests 47 being also provided for this second bed 46.

The operation of the machine is such that by the drive of the motor 11 the lever 16 is oscillated with the shaft 15. The levers 18 move the indenting bar 21 in downward direction in its guides 22, whereby the bar 21 is pressed onto the rolls lying on the now stationary upper collapsible bed 45. Almost immediately after this operation the levers 23 press on the transverse bar 24 and thereby move the rods 25 with the scrapers 33 in downward direction where they are now held in the lowered position by the clamping action of the springs 28, whereas the indenting bar 21 is again raised between them. The scrapers 33 thereby hold back the rolls so that they cannot adhere to the indenting bar 21. At the same time the felt layers of the scrapers 33 which are saturated with oil, supply fresh oil to the indenting bar 21. The rising indenting bar 21, through which the scraper rods 25, 29 pass, then again carries up the scraper rods 25 through encountering a stop on the rods 25, e. g. the nuts 31, whereupon the working operation commences afresh. Whilst the indenting bar 21 is descending the pawl 39 slides idly over the circumference of the ratchet wheel 41, whereas whilst the indenting bar 21 is rising the pawl engages in a tooth 40 and thereby moves on the feed the distance of one row of rolls.

I claim:—

1. A roll indenting machine comprising in combination a base plate for carrying the rolls, an indenting bar adapted for vertical movement with respect to said base plate, rods guided for vertical movement and carrying scrapers resiliently pressed against the lower sides of the said indenting bar, clamping springs engaging the upper portion of the said rods whereby the said rods are guided in their vertical motion and held in their lowest position during the beginning of the upward motion of the said indenting bar.

2. A roll indenting machine comprising in combination, a base plate for carrying the rolls, an indenting bar adapted for vertical movement with respect to said base plate and carrying holes, rods disposed in registry with the holes in the indenting bar and guided for vertical movement, scrapers carried by the rods and resiliently pressed against the lower sides of the said indenting bar, clamping springs engaging the upper portion of the said rods whereby the said rods are guided in their vertical motion and held in their lowest position during the beginning of the upward motion of the said indenting bar.

3. A roll indenting machine comprising in combination a base plate for carrying the rolls, an indenting bar adapted for vertical movement with respect to said base plate, rods guided for vertical movement and carrying U-shaped spring bows carrying scrapers resiliently pressed against the lower sides of the said indenting bar, clamping springs engaging the upper portion of the rods whereby the said rods are guided in their vertical motion and held in their lowest position during the beginning of the upward motion of the said indenting bar.

4. A roll indenting machine comprising in combination a base plate for carrying the rolls, an indenting bar adapted for vertical movement with respect to said base plate, rods adapted guided for vertical movement and carrying U-shaped spring bows carrying scrapers resiliently pressed against the lower sides of the said indenting bar, nuts securing the said bows on the said rods and adapted to act as stops for the said indenting bar on its upward movement, clamping springs engaging the upper portion of the said rods whereby the said rods are guided in their vertical motion and held in their lowest position during the beginning of the upward movement of the said indenting bar.

In testimony whereof I affix my signature.

GOTTHILF HEIM.